(12) United States Patent
Ichikawa

(10) Patent No.: US 11,641,798 B2
(45) Date of Patent: May 9, 2023

(54) ELECTRIC WORKING MACHINE CAPABLE OF DETERMINING TYPE OF TIP TOOL

(71) Applicant: MAKITA CORPORATION, Anjo (JP)

(72) Inventor: Yoshitaka Ichikawa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 587 days.

(21) Appl. No.: 16/787,140

(22) Filed: Feb. 11, 2020

(65) Prior Publication Data

US 2020/0260644 A1 Aug. 20, 2020

(30) Foreign Application Priority Data

Feb. 18, 2019 (JP) .............................. JP2019-026397

(51) Int. Cl.
| | |
|---|---|
| *A01D 34/78* | (2006.01) |
| *A01D 34/68* | (2006.01) |
| *B25F 3/00* | (2006.01) |
| *B25F 5/00* | (2006.01) |
| *A01D 34/416* | (2006.01) |
| *A01D 101/00* | (2006.01) |

(52) U.S. Cl.
CPC .......... *A01D 34/78* (2013.01); *A01D 34/6806* (2013.01); *B25F 3/00* (2013.01); *B25F 5/001* (2013.01); *A01D 34/416* (2013.01); *A01D 2101/00* (2013.01)

(58) Field of Classification Search
CPC ... B25F 3/00; B25F 5/00; B25F 5/001; A01D 2101/00; A01D 34/00; A01D 34/001; A01D 34/006; A01D 34/78; A01D 34/90; A01D 34/416; A01D 34/6806; A01D 34/82
See application file for complete search history.

(56) References Cited

U.S. PATENT DOCUMENTS

| | | | |
|---|---|---|---|
| 6,616,446 B1 * | 9/2003 | Schmid .............. | B23Q 17/0957 433/224 |
| 9,991,825 B1 * | 6/2018 | Ackerman ................ | H02P 7/06 |
| 10,206,329 B2 * | 2/2019 | Alexandersson .... | A01D 34/006 |
| 10,630,227 B2 * | 4/2020 | Trinkle .................. | A01G 3/053 |

(Continued)

FOREIGN PATENT DOCUMENTS

| | | |
|---|---|---|
| CN | 205232798 U | 5/2016 |
| CN | 205694280 U | 11/2016 |

(Continued)

OTHER PUBLICATIONS

Feb. 17, 2022 Office Action issued in U.S. Appl. No. 16/778,276.
(Continued)

*Primary Examiner* — Adam J Behrens
(74) *Attorney, Agent, or Firm* — Oliff PLC

(57) ABSTRACT

An electric working machine includes an attachment portion, a motor, and a controller. Multiple types of tip tools are alternatively attached to the attachment portion. The motor drives the tip tool attached to the attachment portion. The controller has first start control and second start control. The controller is configured to execute the first start control so as to determine the type of the tip tool when not having tool type information, and configured to execute the second start control when having the tool type information.

14 Claims, 12 Drawing Sheets

(56) References Cited

U.S. PATENT DOCUMENTS

| | | |
|---|---|---|
| 2009/0228137 A1 | 9/2009 | Meidar et al. |
| 2012/0138322 A1 | 6/2012 | Neubauer et al. |
| 2013/0205596 A1 | 8/2013 | Pellenc |
| 2014/0083375 A1 | 3/2014 | Kawashima et al. |
| 2014/0165525 A1 | 6/2014 | Nagata |
| 2014/0295755 A1 | 10/2014 | Graf |
| 2014/0352995 A1 | 12/2014 | Matsunaga et al. |
| 2015/0174674 A1 | 6/2015 | Terashima et al. |
| 2016/0021819 A1* | 1/2016 | Nakano .................. A01G 3/062 30/276 |
| 2016/0227694 A1* | 8/2016 | Bermudez .............. A01D 42/00 |
| 2017/0043470 A1 | 2/2017 | Kong |
| 2017/0264219 A1 | 9/2017 | Takeda |
| 2018/0099394 A1 | 4/2018 | Ichikawa et al. |
| 2018/0116104 A1* | 5/2018 | Alexandersson .... A01D 34/416 |
| 2019/0217459 A1* | 7/2019 | Gregorich ............. B23D 51/16 |
| 2019/0280639 A1* | 9/2019 | Trinkle ................ A01D 34/416 |
| 2019/0308309 A1* | 10/2019 | Gregorich ............. B23B 45/003 |
| 2020/0078920 A1* | 3/2020 | Ikeda ..................... B25F 5/001 |
| 2020/0346335 A1* | 11/2020 | Yang ........................ B25F 3/00 |

FOREIGN PATENT DOCUMENTS

| | | | |
|---|---|---|---|
| CN | 106664942 A | 5/2017 | |
| CN | 106900269 A | 6/2017 | |
| CN | 206274760 U | 6/2017 | |
| JP | 2013-165678 A | 8/2013 | |
| JP | 2014-233793 A | 12/2014 | |
| JP | 6137467 B2 | 5/2017 | |
| JP | 2018-512119 A | 5/2018 | |
| JP | 6357116 B2 | 7/2018 | |
| WO | WO-2015161721 A1 * | 10/2015 | ............... B25F 3/00 |

OTHER PUBLICATIONS

Jul. 11, 2022 Office Action issued in Chinese Patent Application No. 202010057196.3.

Sep. 6, 2022 Office Action issued in Japanese Application No. 2019-026397.

Sep. 6, 2022 Office Action issued in Japanese Application No. 2019-026395.

May 23, 2022 Office Action issued in U.S. Appl. No. 16/778,276.

\* cited by examiner

ELECTRIC WORKING MACHINE CAPABLE OF DETERMINING TYPE OF TIP TOOL

CROSS-REFERENCE TO RELATED APPLICATIONS

This application claims the benefit of Japanese Patent Application No. 2019-026397 filed on Feb. 18, 2019 with the Japan Patent Office, the entire disclosure of which is incorporated herein by reference.

BACKGROUND

The present disclosure relates to an electric working machine to which multiple types of tip tools are alternatively attached.

Japanese Patent No. 6137467 (Patent Document 1) discloses an electric working machine that determines a moment of inertia based on a speed variation rate during deceleration or acceleration of a motor, and sets a braking force of the motor in accordance with the moment of inertia. Therefore, the electric working machine disclosed in Patent Document 1 can suppress a large reaction given to a user during braking when a tip tool with a large moment of inertia is attached to the electric working machine.

SUMMARY

In the technique disclosed in Patent Document 1, the type of the attached tip tool may not be accurately determined.

It is desirable that the present disclosure improves determination accuracy of the type of the attached tip tool.

One aspect of the present disclosure provides an electric working machine including an attachment portion, a motor, and a controller. Multiple types of tip tools are alternatively attached to the attachment portion. The motor drives a tip tool attached to the attachment portion. The controller has first start control and second start control. The controller is configured to execute the first start control so as to determine the type of the tip tool in response to not having tool type information on the tip tool. The controller is configured to execute the second start control in response to having the tool type information. In the first start control, the motor is started and controlled with a first parameter. In the second start control, the motor is started and controlled with a second parameter that is different from the first parameter.

The electric working machine of the present disclosure configured as above can improve determination accuracy of the type of the attached tip tool since the type of the tip tool is determined by executing the first start control in which the motor is started and controlled with the first parameter. The electric working machine of the present disclosure executes the second start control when having the tool type information. Therefore, the electric working machine of the present disclosure can suppress loss of workability by the electric working machine due to having a function to determine the type of the tip tool. Also, since the electric working machine of the present disclosure does not execute the first start control after determining the type of the tip tool, deterioration in usability, such as sluggish startup, can be suppressed.

Another aspect of the present disclosure provides an electric working machine including an attachment portion, a motor, and a controller. The controller has first start control and second start control. The controller is configured to execute the first start control at initial startup following power supply so as to determine a type of a tip tool. The controller is configured to execute the second start control at startup after execution of the first start control following the power supply.

The electric working machine of the present disclosure configured as above can improve determination accuracy of the type of the attached tip tool since the type of the tip tool is determined by executing the first start control in which the motor is started and controlled with the first parameter. The electric working machine of the present disclosure executes the second start control at startup after execution of the first start control. Therefore, the electric working machine of the present disclosure can suppress loss of workability by the electric working machine due to having a function to determine the type of the tip tool. Since the electric working machine of the present disclosure does not execute the first start control after the first start control is executed at initial startup following the power supply, deterioration in usability, such as sluggish startup, can be suppressed.

In one and another aspects of the present disclosure, the controller may be configured to detect a determination parameter set in advance to determine the type of the tip tool, and determine the type of the tip tool by determining whether the determination parameter exceeds a preset tip tool determination value when executing the first start control. Therefore, the electric working machine of the present disclosure can determine the type of the tip tool by a simple method of comparing the determination parameter with the tip tool determination value.

In one and another aspects of the present disclosure, the electric working machine may include a rotation speed manipulator configured to be manipulated by an operator to set rotation speed of the motor. In the first start control, manipulation performed on the rotation speed manipulator may be disabled. This allows the electric working machine of the present disclosure to easily drive the motor so that the type of the tip tool can be determined.

In one and another aspects of the present disclosure, an increase in first rotation speed may be larger than an increase in second rotation speed. An increase in rotation speed is an amount of increase in rotation speed of the motor per unit time. The increase in first rotation speed is an amount of increase in rotation speed in the case of rotating the motor during execution of the first start control by the controller. The increase in second rotation speed is an amount of increase in rotation speed in the case of rotating the motor during execution of the second start control by the controller. This allows the electric working machine of the present disclosure to increase electric current flowing to the motor and easily determine the type of the tip tool.

In one and another aspects of the present disclosure, the electric working machine may include a driving operating portion configured to be manipulated by an operator to switch between driving and stopping the motor. In the first start control, manipulation on other portions than the driving operating portion may be disabled. This allows the electric working machine of the present disclosure to easily drive the motor so that the type of the tip tool can be determined.

In one and another aspects of the present disclosure, the electric working machine may be a grass cutter.

BRIEF DESCRIPTION OF THE DRAWINGS

Exemplary embodiments of the present disclosure will be described hereinafter with reference to the accompanying drawings, in which.

DETAILED DESCRIPTION OF EXEMPLARY EMBODIMENTS

First Embodiment

Figure 1:
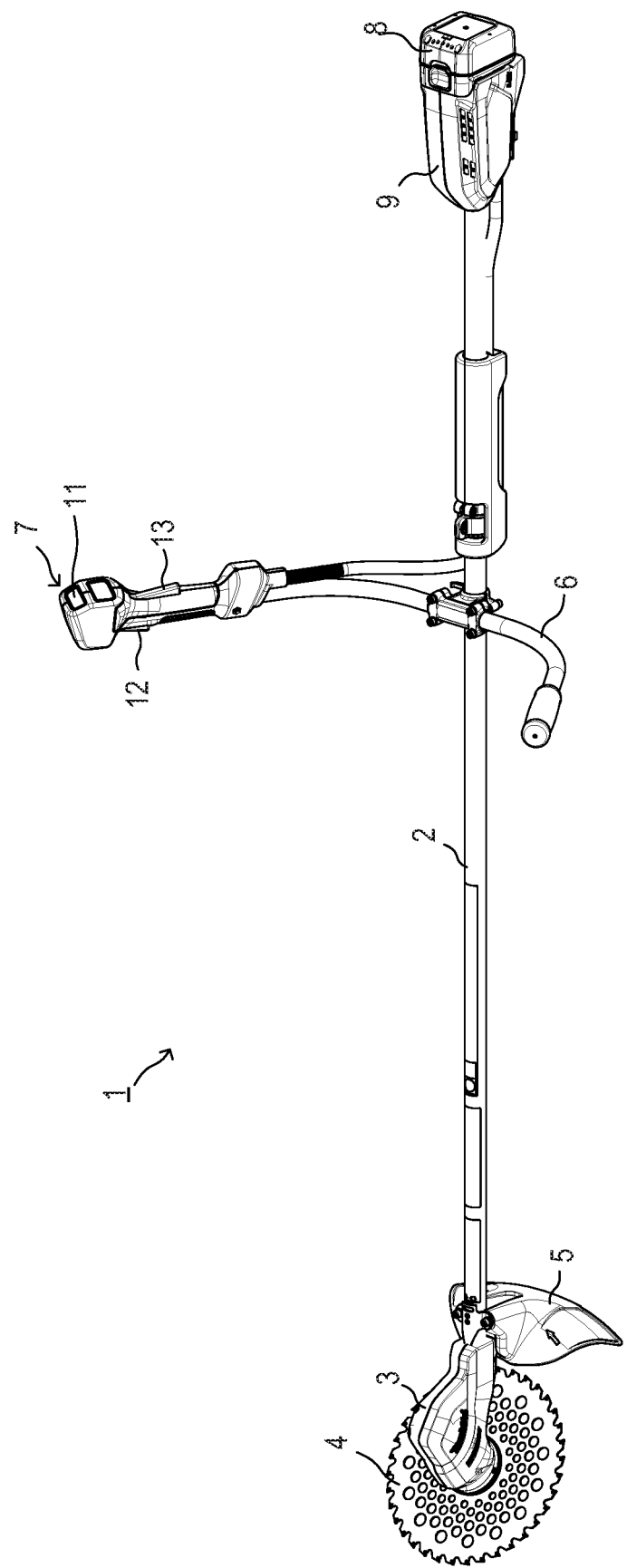
FIG. 1 is a perspective view showing an overall configuration of a grass cutter.

As shown in FIG. 1, a grass cutter 1 of the present embodiment includes a main pipe 2, a drive portion 3, a rotary blade 4, a cover 5, a handle 6, an operation/display portion 7, a battery pack 8, and a control portion 9.

The main pipe 2 is formed into a long and hollow rod. The drive portion 3 is attached to one end of the main pipe 2, and the control portion 9 is attached to the other end of the main pipe 2. Hereinafter, one side of the main pipe 2 with the drive portion 3 is referred to as a front side, and the other side with the control portion 9 is referred to as a rear side.

The drive portion 3 is equipped with a motor 20 which is a drive source for rotationally driving the rotary blade 4. The motor 20 is not shown in FIG. 1, but shown in FIG. 2. The drive portion 3 includes a gear mechanism for deceleration at a tip end of a rotation shaft of the motor 20. The rotary blade 4 is detachably attached to an output shaft of the gear mechanism. Therefore, when the motor 20 rotates, the rotation is transmitted to the output shaft via the gear mechanism, and the output shaft integrally rotates with the rotary blade 4.

The rotary blade 4 is a metal blade or a nylon cord cutter. An operator can attach one of the metal blade and the nylon cord cutter to the drive portion 3 as the rotary blade 4. FIG. 1 shows the metal blade attached as the rotary blade 4. The rotary blade 4 can rotate to cut grass, bushes and the like.

The metal blade is formed of a metal material in a disc shape. Saw blade teeth are formed along an outer circumference of the disc.

The nylon cord cutter includes a cylindrical spool and a nylon cord housed in the spool. When the nylon cord cutter is attached to the output shaft of the drive portion 3, the nylon cord cutter rotates by a rotational driving force of the motor 20. Two holes are formed on a side surface of the spool forming the nylon cord cutter, and the nylon cord is pulled out from these two holes. When the spool rotates and the nylon cord pulled out from the spool hits grass and the like, the grass and the like are cut.

The cover 5 is attached to a front end side of the main pipe 2 to be arranged on the rear side of the rotary blade 4. The cover 5 deters the grass and the like cut by the rotary blade 4 from flying to an operator side.

The handle 6 is gripped by the operator when the operator performs cutting using the grass cutter 1. The handle 6 is coupled to the main pipe 2 near the middle position in a length direction of the main pipe 2. The handle 6 is formed into a U-shape, and grips are provided at both ends of the U-shape.

The operation/display portion 7 has a function for the operator to manipulate the grass cutter 1 with a finger, and a function to display an operation state of the grass cutter 1. The operation/display portion 7 is attached to one of the grips of the handle 6.

The operation/display portion 7 includes an indicator 11 that displays the operation state of the grass cutter 1, a trigger switch 12, and a lock-off switch 13. The trigger switch 12 is operated to input a drive command of the motor 20. The trigger switch 12 is configured by a tactile switch that turns on only while the operator pushes down the trigger switch 12. The lock-off switch 13 is operated to enable manipulation of the trigger switch 12.

The battery pack 8 is detachably attached to the control portion 9 and supplies direct current power to the control portion 9.

Figure 2:
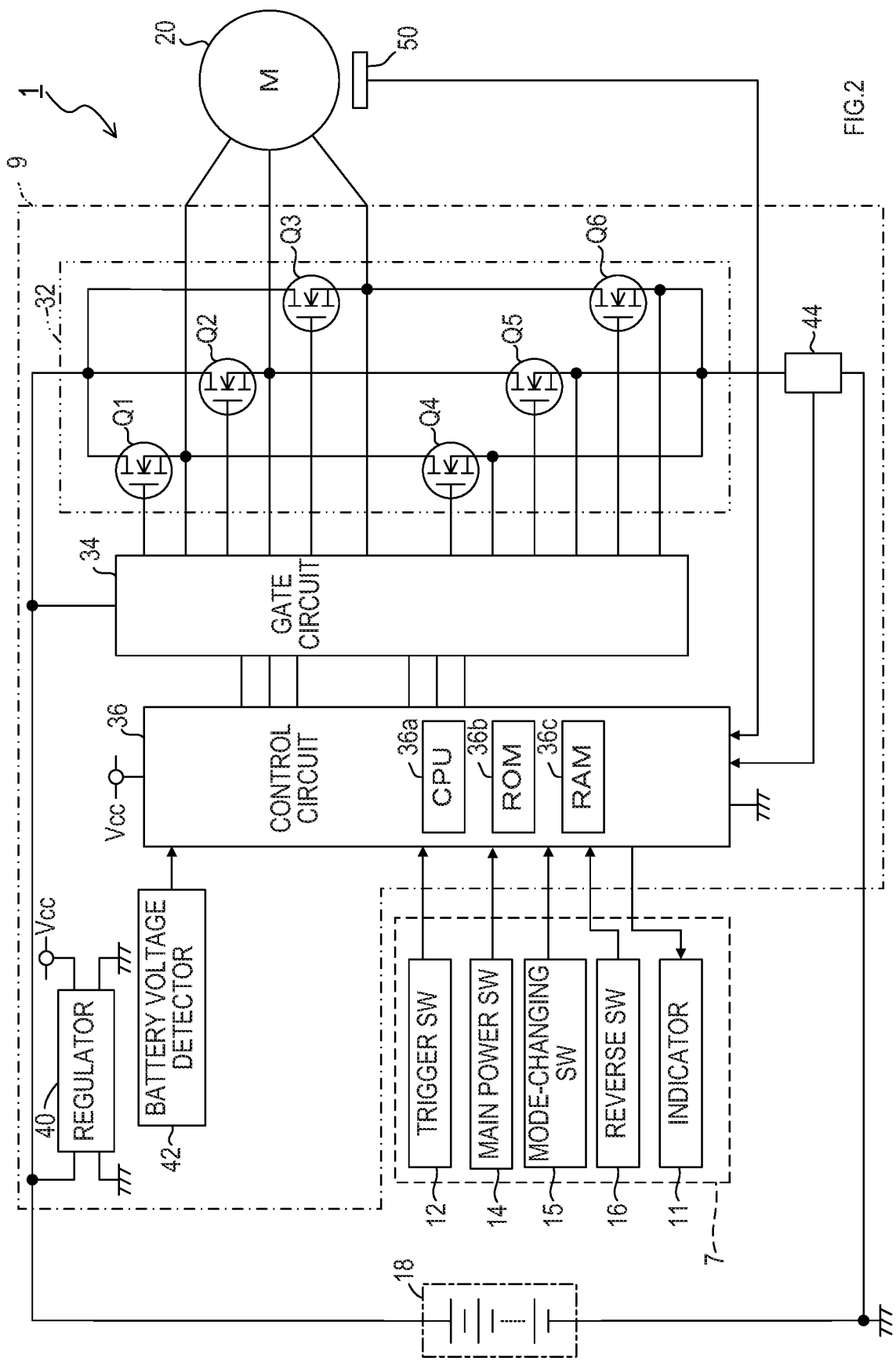
FIG. 2 is a block diagram showing an electrical configuration of the grass cutter.

As shown in FIG. 2, the control portion 9 includes a drive circuit 32, a gate circuit 34, a control circuit 36, and a regulator 40. The control portion 9 receives power supply from a battery 18 in the battery pack 8, and drives and controls the motor 20. In the present embodiment, the motor 20 is a three-phase brushless motor.

The drive circuit 32 receives power supply from the battery 18, and flows electric current to each phase winding of the motor 20. In the present embodiment, the drive circuit 32 is configured as a three-phase full-bridge circuit that includes six switching-elements Q1, Q2, Q3, Q4, Q5, Q6. In the present embodiment, the switching-elements Q1 to Q6 are MOSFETs.

In the drive circuit 32, the switching-elements Q1 to Q3 are provided between terminals U, V, W of the motor 20 and a power-supply line coupled to a positive side of the battery 18 respectively. The switching-elements Q4 to Q6 are provided between the terminals U, V, W of the motor 20 and a ground line coupled to a negative side of the battery 18 respectively.

The gate circuit 34 turns on/off each of the switching-elements Q1 to Q6 in the drive circuit 32 in accordance with a control signal outputted from the control circuit 36, thereby flowing electric current to each phase winding of the motor 20 to rotate the motor 20.

The control circuit 36 is configured mainly by a microcomputer including a CPU 36a, a ROM 36b, a RAM 36c and the like. Various functions of the microcomputer are implemented by the CPU 36a executing a program stored in a non-transitory tangible storage medium. In this example, the ROM 36b corresponds to the non-transitory tangible storage medium that stores the program. Also, by execution of this program, a method corresponding to the program is executed. A part or all of the functions executed by the CPU 36a may be configured in hardware, using one or more ICs and the like. The control circuit 36 may be configured by one or more microcomputers.

The control portion 9 includes a battery voltage detector 42 and a current detection circuit 44. The battery voltage detector 42 detects voltage of the battery 18. The current detection circuit 44 detects electric current having flown to the motor 20.

The grass cutter 1 includes a rotation sensor 50 that detects a rotational position and rotation speed of the motor 20.

The operation/display portion 7 further includes a main power switch 14, a mode-changing switch 15 and a reverse switch 16.

The main power switch 14 is configured as a tactile switch that is turned on only while the operator pushes down the main power switch 14. Therefore, the control circuit 36 recognizes that each time the main power switch 14 is turned on, main power is switched between ON and OFF.

The mode-changing switch 15 is operated to change the rotation speed of the motor 20 to high, medium or low. The mode-changing switch 15 is configured as a tactile switch that is turned on only while the operator pushes down the switch.

The reverse switch 16 is operated to switch a rotation direction of the motor 20 to a forward direction which is a direction to cut an object or a reverse direction opposite to the forward direction. The reverse switch 16 is configured as a tactile switch that is turned on only while the operator pushes down the switch.

The above-described indicator 11, trigger switch 12, main power switch 14, mode-changing switch 15, reverse switch 16, battery voltage detector 42, current detection circuit 44, and rotation sensor 50 are coupled to the control circuit 36.

The regulator 40 receives electric power from the battery 18 to generate a power supply voltage Vcc for operating the control circuit 36, and supplies electric power to the internal circuits of the control portion 9.

The regulator 40 is started when the main power switch 14 is turned on and starts power supply to the control circuit 36. Thus, the control circuit 36 is started and executes a grass cutter control process.

Firstly, a procedure of the grass cutter control process executed by the control circuit 36 will be described. The grass cutter control process is repeatedly executed in a preset control cycle (for example, 1 ms).

Figure 3:
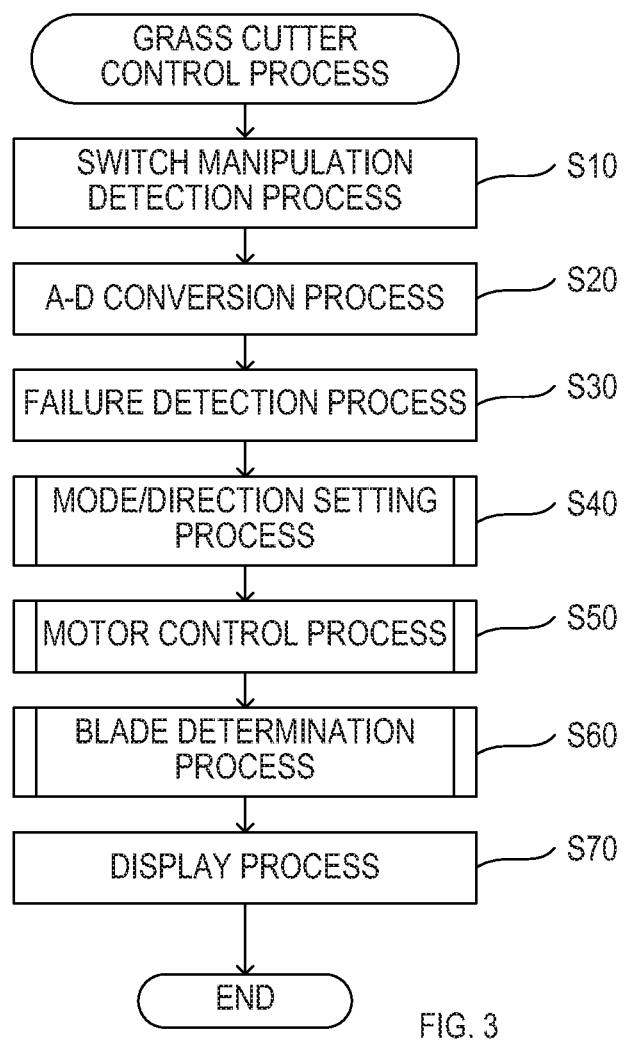
FIG. 3 is a flowchart showing a grass cutter control process.

When the grass cutter control process is executed, the control circuit 36, as shown in FIG. 3, executes a switch manipulation detection process in S10. In the switch manipulation detection process, the control circuit 36 detects whether the trigger switch 12, the mode-changing switch 15, and the reverse switch 16 are ON.

In S20, the control circuit 36 executes an A-D conversion process. In the A-D conversion process, the control circuit 36 performs A-D conversion of a detection signal from the battery voltage detector 42 and a detection signal from the current detection circuit 44, and stores the conversion result in the RAM 36c.

In S30, the control circuit 36 executes a failure detection process. In the failure detection process, the control circuit 36, based on the conversion result obtained from the A-D conversion process of S20, detects a failure such as an overcurrent and a battery voltage drop.

In S40, the control circuit 36 executes a mode/direction setting process. The mode/direction setting process will be described later in detail.

In S50, the control circuit 36 executes a motor control process. The motor control process will be described later in detail.

In S60, the control circuit 36 executes a blade determination process. The blade determination process will be described later in detail.

In S70, the control circuit 36 executes a display process, and ends the grass cutter control process once. In the display process, the control circuit 36 displays an operation state of the motor 20, remaining energy of the battery 18, failure of the grass cutter 1 and the like on the indicator 11.

A procedure of the mode/direction setting process executed in S40 will be described.

Figure 4:
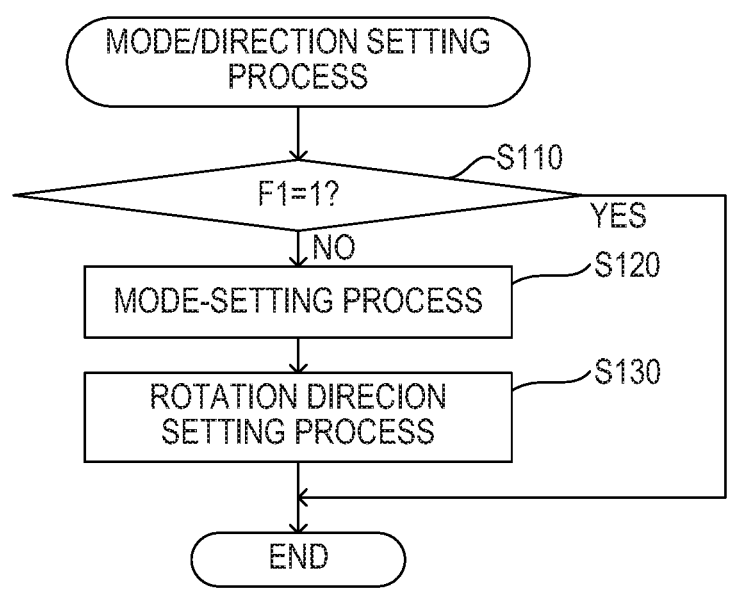
FIG. 4 is a flowchart showing a mode/direction setting process.

When the mode/direction setting process is executed, the control circuit 36, as shown in FIG. 4, first determines in S110 whether a blade determination flag F1 provided in the RAM 36c is set. In the following description, setting a flag indicates setting a flag value to "1", and clearing the flag indicates setting the flag value to "0".

When the blade determination flag F1 is set, the control circuit 36 ends the mode/direction setting process. When the blade determination flag F1 is cleared, the control circuit 36 executes the mode-setting process in S120. In the mode-setting process, the control circuit 36, based on the detection result of the mode-changing switch 15 in the switch manipulation detection process, sets an operation mode to one of a high speed mode, a medium speed mode and a low speed mode. Specifically, each time the mode-changing switch 15 is turned on, the operation mode is changed sequentially from the high speed mode to the medium speed mode, then from the medium speed mode to the low speed mode, and then from the low speed mode to the high speed mode (the same applies hereinafter).

In S130, the control circuit 36 executes a rotation direction setting process, and ends the mode/direction setting process. In the rotation direction setting process, the control circuit 36, based on the detection result of the reverse switch 16 in the switch manipulation detection process, alternately switches the rotation direction of the motor 20 between the forward direction and the reverse direction each time the reverse switch 16 is turned on.

A motor control process executed in S50 will be described.

Figure 5:
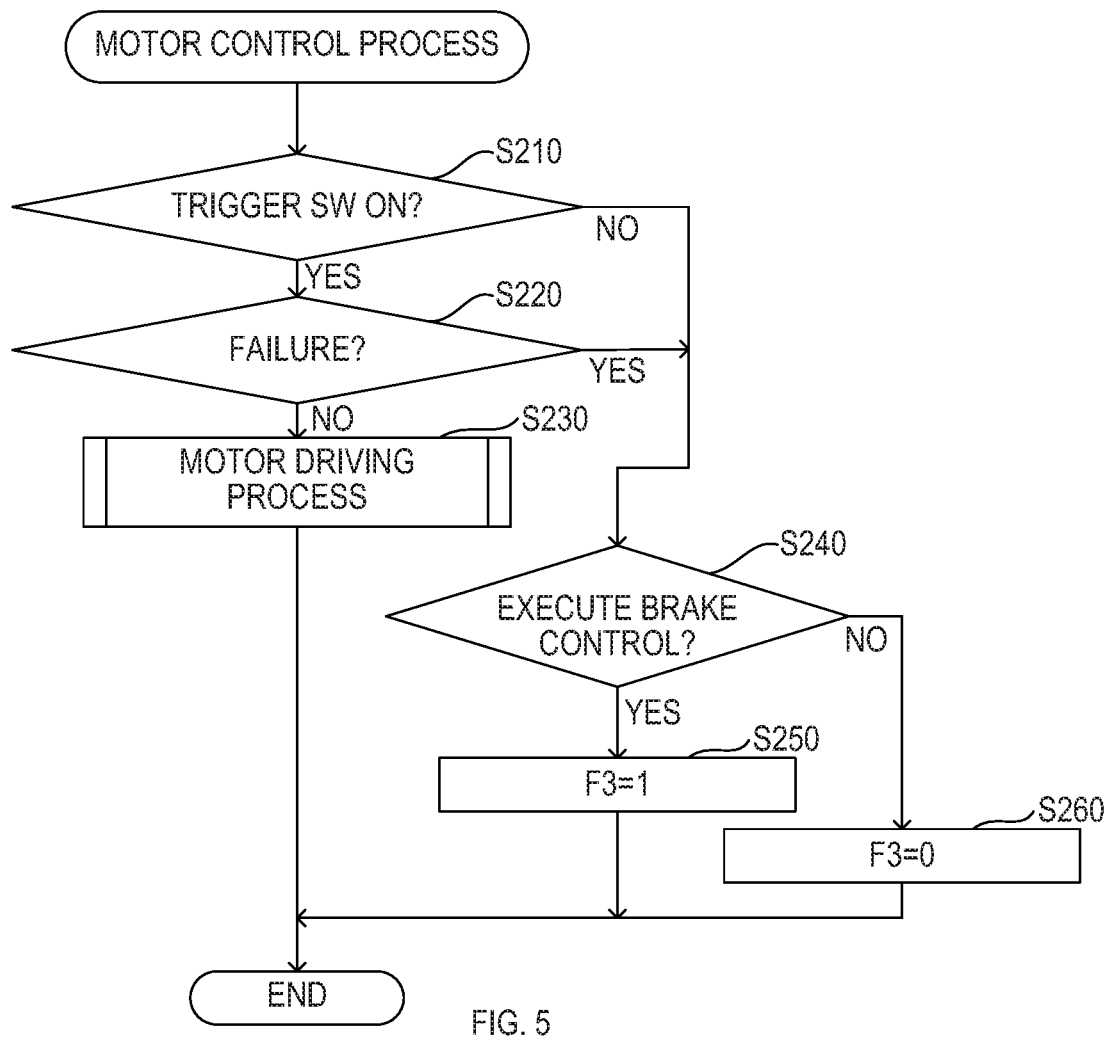
FIG. 5 is a flowchart showing a motor control process.

When the motor control process is executed, the control circuit 36, as shown in FIG. 5, first determines in S210 whether the trigger switch 12 is ON. When the trigger switch 12 is not ON, the control circuit 36 moves to S240.

When the trigger switch 12 is ON, the control circuit 36 determines in S220 whether a failure is detected in the failure detection process of S30. When no failure is detected, the control circuit 36 executes a motor driving process in S230, and ends the motor control process. The motor driving process will be described later in detail. When a failure is detected, the control circuit 36 moves to S240.

When moving to S240, the control circuit 36 determines whether to execute brake control. Specifically, the control circuit 36 determines to execute the brake control when the motor 20 is rotating and when the control portion 9 is not affected even if a braking force is generated in the motor 20. When the control circuit 36 determines to execute the brake control, the control circuit 36 sets a brake flag F3 provided in the RAM 36c in S250, and ends the motor control process. Setting the brake flag F3 causes the control circuit 36 to execute short-circuit braking by turning on or off the switching-elements Q1 to Q6 according to a preset procedure, and generate a braking force in the motor 20.

The control circuit 36, when determining that the brake control is not to be executed, clears the brake flag F3 in S260, and ends the motor control process.

A procedure of the motor driving process executed in S230 will be described.

Figure 6:
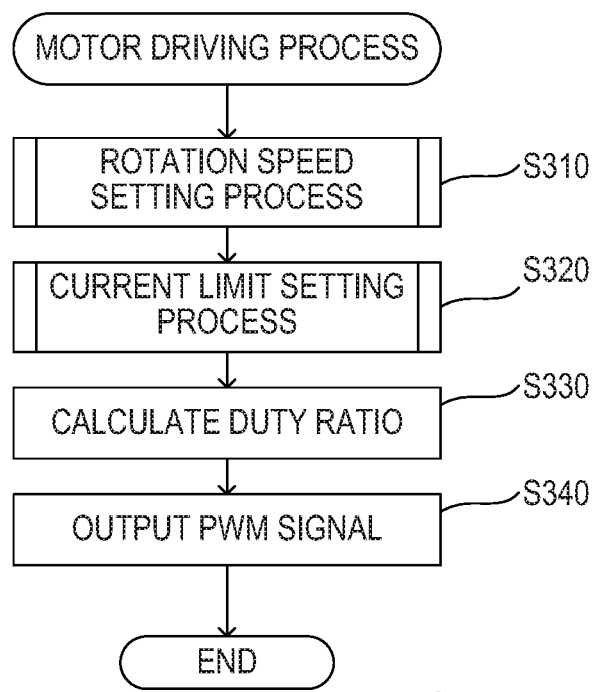
FIG. 6 is a flowchart showing a motor driving process.

When the motor driving process is executed, the control circuit 36, as shown in FIG. 6, first executes a rotation speed setting process in S310. The rotation speed setting process will be described later in detail.

The control circuit 36 executes a current limit setting process in S320. The current limit setting process will be described later in detail.

In S330, the control circuit 36 calculates a duty ratio of a PWM signal so that a deviation between the rotation speed and target rotation speed of the motor 20 becomes 0 (zero) by feedback control.

In S340, the control circuit 36 outputs the PWM signal having the duty ratio set in S330 to the gate circuit 34, and ends the motor driving process.

A procedure of the rotation speed setting process executed in S310 will be described.

Figure 7:
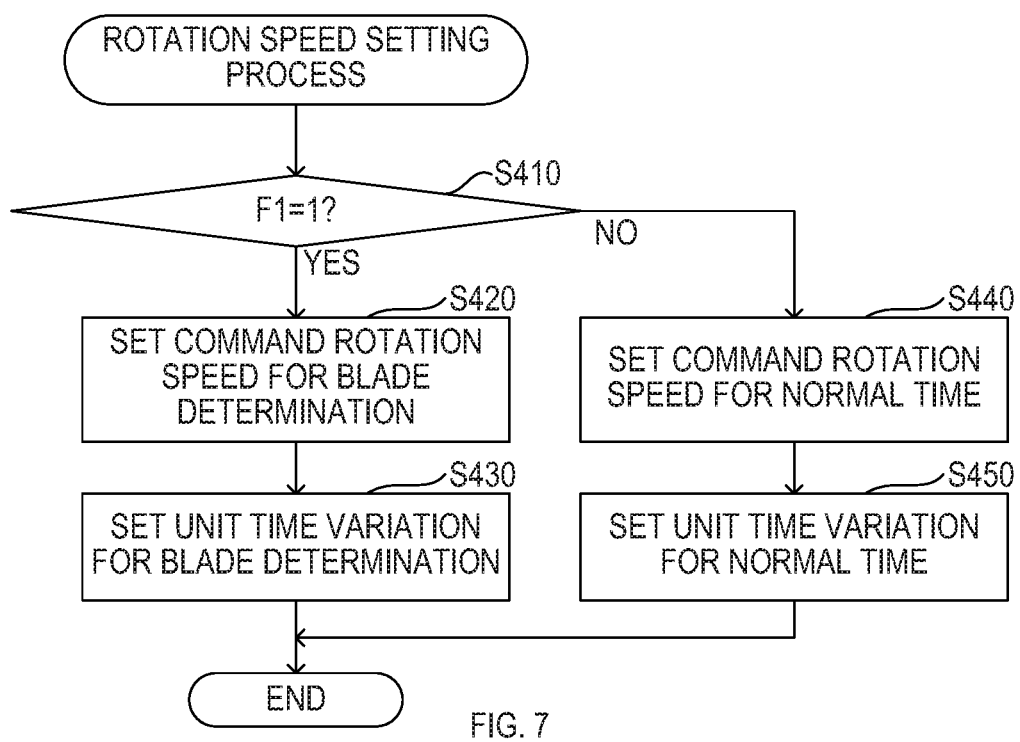
FIG. 7 is a flowchart showing a rotation speed setting process.

When the rotation speed setting process is executed, the control circuit 36, as shown in FIG. 7, first determines in S410 whether the blade determination flag F1 is set. When the blade determination flag F1 is set, the control circuit 36 sets a command rotation speed for blade determination in S420. Specifically, the control circuit 36 sets the command rotation speed to a preset command rotation speed for blade determination.

In S430, the control circuit 36 sets a unit time variation for blade determination, and ends the rotation speed setting process. Specifically, the control circuit 36 sets the unit time variation to a preset blade determination variation. Thus, the control circuit 36 increases the target rotation speed by the unit time variation each time the aforementioned execution cycle elapses until the target rotation speed coincides with the command rotation speed for blade determination.

When the blade determination flag F1 is cleared in S410, the control circuit 36 sets a command rotation speed for normal time in S440. Specifically, the control circuit 36, based on the operation mode set in the mode-setting process of S120 and the determined blade type, sets the command rotation speed to a preset command rotation speed for normal time.

For example, the control circuit 36, when the determined blade type is a metal blade, sets one of a first rotation speed for metal blade, a second rotation speed for metal blade and a third rotation speed for metal blade as the command rotation speed for normal time. The first rotation speed for metal blade is selected when the operation mode is the high speed mode. The second rotation speed for metal blade is selected when the operation mode is the medium speed mode. The third rotation speed for metal blade is selected when the operation mode is the low speed mode.

The control circuit 36, when the determined blade type is a nylon cord cutter, sets one of a first rotation speed for nylon, a second rotation speed for nylon and a third rotation speed for nylon as the command rotation speed for normal time. The first rotation speed for nylon is selected when the operation mode is the high speed mode. The second rotation speed for nylon is selected when the operation mode is the medium speed mode. The third rotation speed for nylon is selected when the operation mode is the low speed mode.

The first rotation speed for metal blade, the second rotation speed for metal blade and the third rotation speed for metal blade are respectively set to be higher than the first rotation speed for nylon, the second rotation speed for nylon and the third rotation speed for nylon.

In S450, the control circuit 36 sets the unit time variation for normal time and ends the rotation speed setting process. Specifically, the control circuit 36 sets the unit time variation to a preset normal time variation. Thus, the control circuit 36 increases the target rotation speed by the unit time variation each time the aforementioned execution cycle elapses until the target rotation speed coincides with the command rotation speed for normal time. The blade determination variation is set to be larger than the normal time variation.

A procedure of the current limit setting process executed in S320 will be described.

Figure 8:
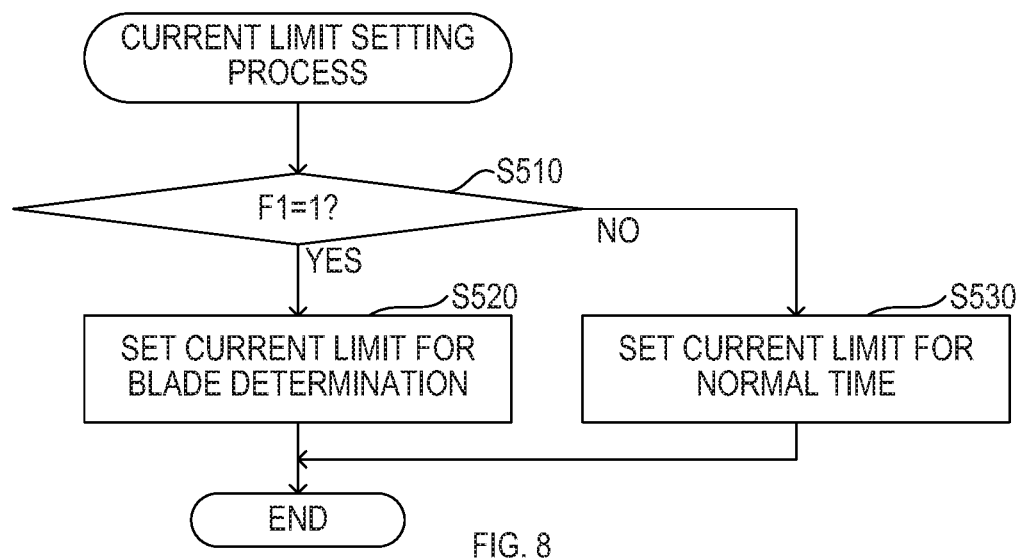
FIG. 8 is a flowchart showing a current limit setting process.

When the current limit setting process is executed, the control circuit 36, as shown in FIG. 8, first determines in S510 whether the blade determination flag F1 is set. When the blade determination flag F1 is set, the control circuit 36 sets a current limit for blade determination in S520, and ends the current limit setting process. Specifically, the control circuit 36 sets the current limit to a preset blade determination limit.

When the blade determination flag F1 is cleared, the control circuit 36 sets a current limit for normal time in S530, and ends the current limit setting process. Specifically, the control circuit 36 set the current limit to a preset normal time limit.

A procedure of the blade determination process executed in S60 will be described.

Figure 9:
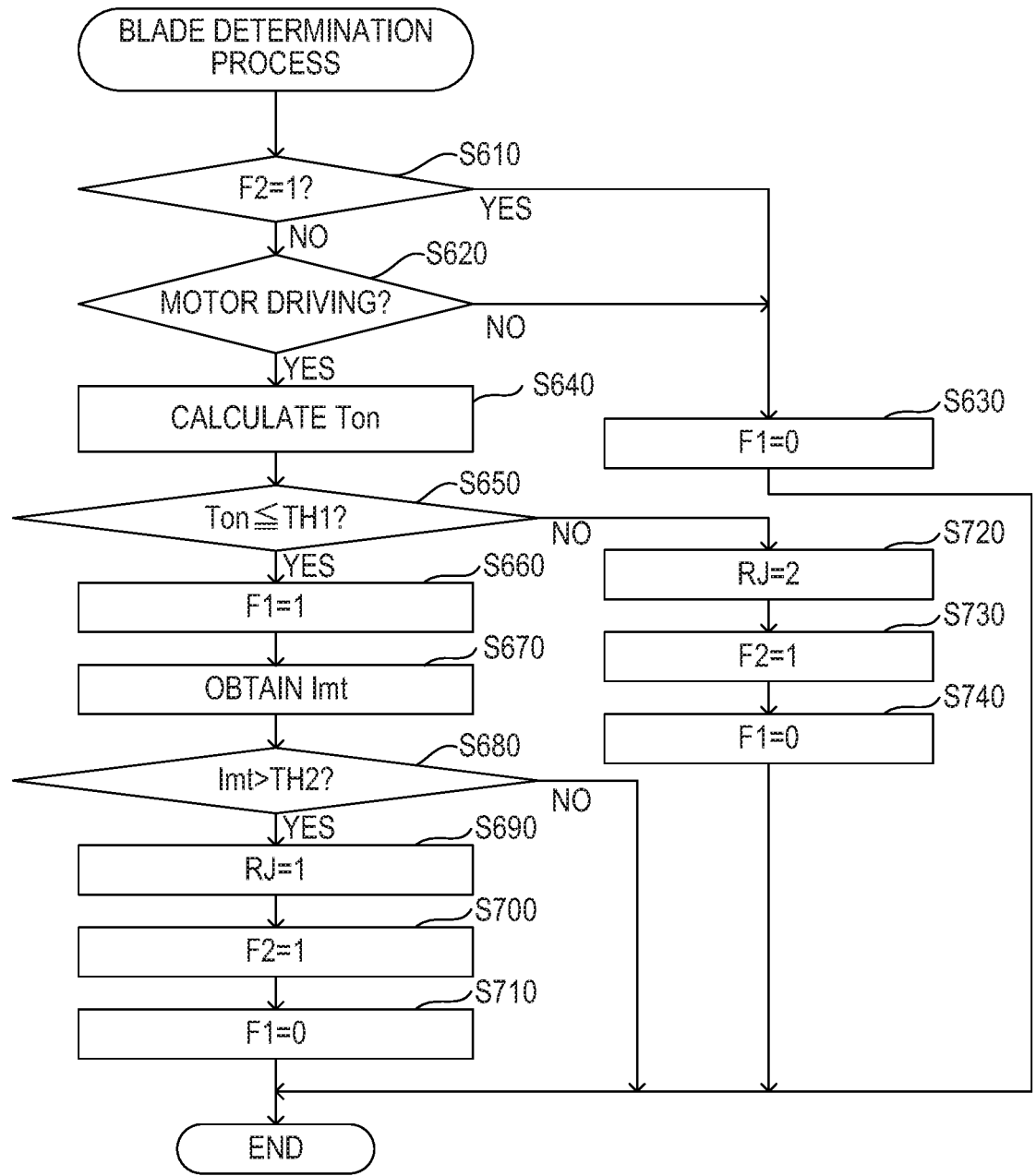
FIG. 9 is a flowchart showing a blade determination process according to a first embodiment.

When the blade determination process is executed, the control circuit 36, as shown in FIG. 9, first determines in S610 whether a blade determination complete flag F2 provided in the RAM 36c is set. When the blade determination complete flag F2 is set, the control circuit 36 moves to S630. When the blade determination complete flag F2 is cleared, the control circuit 36 determines in S620 whether the motor 20 is driving. When the motor 20 is not driving, the control circuit 36 moves to S630.

In S630, the control circuit 36 clears the blade determination flag F1, and ends the blade determination process.

When it is determined in S620 that the motor 20 is driving, the control circuit 36 calculates time elapsed since the motor 20 starts driving (hereinafter, ON time), and stores the calculated ON time in an ON time Ton provided in the RAM 36c in S640.

The control circuit 36 determines in S650 whether the value stored in the ON time Ton is equal to or smaller than a preset period determination value TH1. When the value stored in the ON time Ton is equal to or smaller than the period determination value TH1, the control circuit 36 sets the blade determination flag F1 in S660.

Moreover, the control circuit 36 obtains a value stored in a motor current Imt provided in the RAM 36c in S670. The motor current Imt stores a value of motor current indicated by the detection signal inputted from the current detection circuit 44.

The control circuit 36 determines in S680 whether the value stored in the motor current Imt exceeds a preset metal blade determination value TH2. When the value stored in the motor current Imt is equal to or smaller than the metal blade determination value TH2, the control circuit 36 ends the blade determination process.

When the value stored in the motor current Imt exceeds the metal blade determination value TH2, the control circuit 36 stores "1" in a blade determination result RJ provided in the RAM 36c in S690. This confirms that the attached blade is a metal blade.

In S700, the control circuit 36 sets the blade determination complete flag F2. In S710, the control circuit 36 clears the blade determination flag F1 and ends the blade determination process.

In S650, when the value stored in the ON time Ton exceeds the period determination value TH1, the control circuit 36 stores "2" in the blade determination result RJ in S720. This confirms that the attached blade is a nylon cord cutter.

In S730, the control circuit 36 sets the blade determination complete flag F2. In S740, the control circuit 36 clears the blade determination flag F1 and ends the blade determination process.

A specific example of blade determination, in which a metal blade is attached, will be described.

Figure 10:
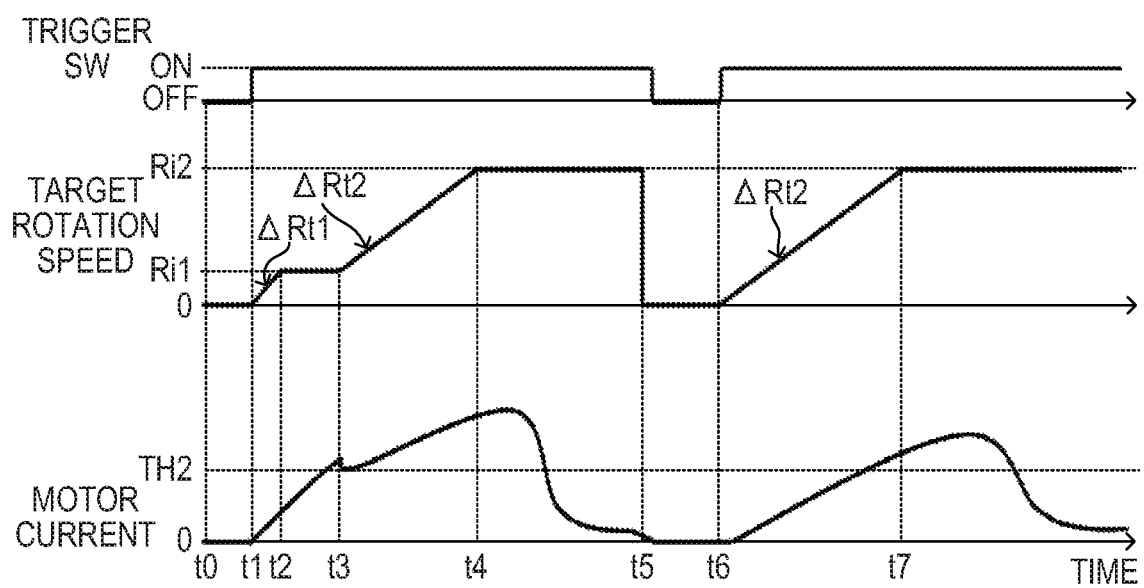
FIG. 10 is a timing chart showing a specific example of blade determination in a case where a metal blade is attached.

As shown in FIG. 10, assume that the trigger switch 12 is OFF, the target rotation speed is zero (0), and the motor current is zero (0) at time t0.

At time t1, assume that the trigger switch 12 is switched from OFF to ON. This gradually increases the target rotation speed at a blade determination variation ΔRt1, and the target rotation speed reaches a command rotation speed for blade determination Ri1 at time t2.

Assume that, due to increase in the target rotation speed, the motor current gradually increases, and exceeds the metal blade determination value TH2 at time t3. This completes the blade determination, and the control circuit 36 determines that the metal blade is attached.

The target rotation speed gradually increases at a normal time variation ΔRt2, and reaches a command rotation speed for normal time Ri2 at time t4. The command rotation speed for normal time Ri2 is set for metal blade. Also, due to increase in the target rotation speed, the motor current gradually increases.

Assume that the trigger switch 12 is switched from ON to OFF at time t5. This sets the target rotation speed to zero (0), and the motor current decreases to zero (0).

Assume that, at time t6, the trigger switch 12 is switched from OFF to ON. The target rotation speed gradually increases at the normal time variation ΔRt2 and reaches the command rotation speed for normal time Ri2 at time t7. Also, due to increase in the target rotation speed, the motor current gradually increases.

A specific example of blade determination, in which a nylon cord cutter is attached, will be described.

Figure 11:
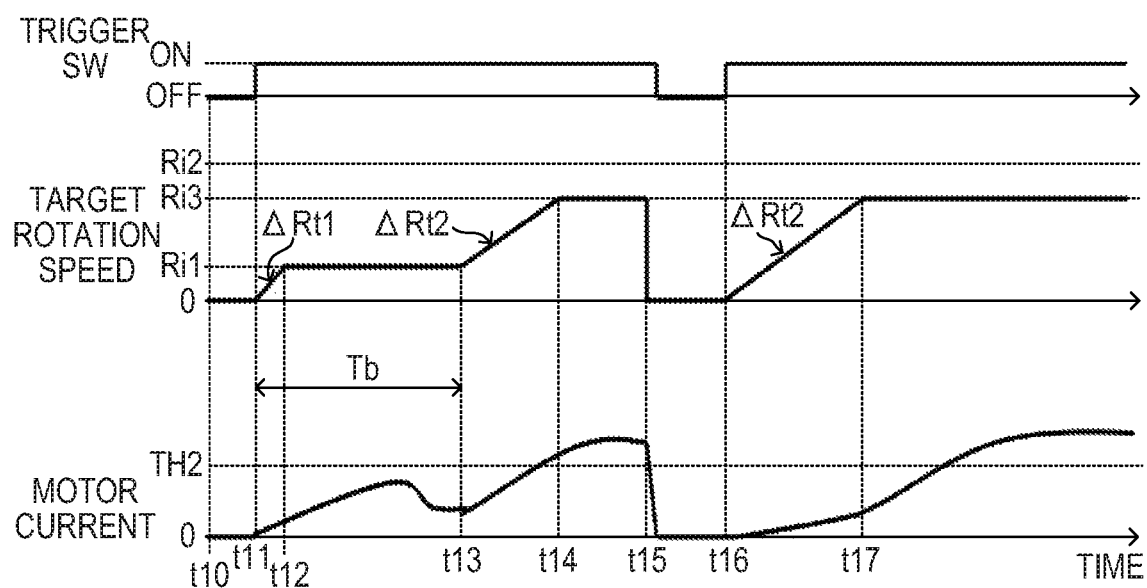
FIG. 11 is a timing chart showing a specific example of blade determination in a case where a nylon cord cutter is attached.

As shown in FIG. 11, assume that, at time t10, the trigger switch 12 is OFF, the target rotation speed is zero (0), and the motor current is zero (0).

Assume that, at time t11, the trigger switch 12 is switched from OFF to ON. This gradually increases the target rotation speed at the blade determination variation ΔRt1, and the target rotation speed reaches the command rotation speed for blade determination Ri1 at time t12. Due to increase in the target rotation speed, the motor current gradually increases.

At time t13, blade determination time Tb elapses. Since the motor current does not exceed the metal blade determination value TH2 within the blade determination time Tb, the control circuit 36 determines that a nylon cord cutter is attached and completes the blade determination.

The target rotation speed gradually increases at the normal time variation ΔRt2, and reaches a command rotation speed for normal time Ri3 at time t14. The command rotation speed for normal time Ri3 is set for the nylon cord cutter. Also, due to increase in the target rotation speed, the motor current gradually increases.

Assume that, at time t15, the trigger switch 12 is switched from ON to OFF. This sets the target rotation speed to zero (0), and the motor current decreases to zero (0).

Also, assume that, at time t16, the trigger switch 12 is switched from OFF to ON. This gradually increases the target rotation speed at a normal time variation ΔRt2, and the target rotation speed reaches the command rotation speed for normal time Ri3 at time t17. Also, due to increase in the target rotation speed, the motor current gradually increases.

The grass cutter 1 configured as above includes the drive portion 3, the motor 20, and the control portion 9. Multiple types of rotary blades 4 are alternatively attached to the drive portion 3. The motor 20 drives the rotary blade 4 attached to the drive portion 3.

The control portion 9 has first start control and second start control. The control portion 9 executes the first start control so as to determine the type of the rotary blade 4 when not having the blade determination result RJ for the rotary blade 4, and executes the second start control when having the blade determination result RJ. In the first start control, the motor 20 is started and controlled with the command rotation speed and the unit time variation for blade determination. In the second start control, the motor 20 is started and controlled with the command rotation speed and the unit time variation for normal time.

As above, the grass cutter 1 determines the type of the rotary blade 4 by executing the first start control in which the motor 20 is started and controlled with the command rotation speed and the unit time variation for blade determination. Therefore, determination accuracy of the type of the attached rotary blade 4 can be improved. The grass cutter 1 executes the second start control when having the blade determination result RJ. Therefore, the grass cutter 1 can suppress loss of workability by the grass cutter 1 due to having a function to determine the type of the rotary blade 4. Also, the grass cutter 1, after determining the type of the rotary blade 4, does not execute the first start control. Therefore, deterioration in usability, such as sluggish startup, can be suppressed.

The control portion 9 is configured to detect the preset motor current Imt to determine the type of the rotary blade 4. The control portion 9 determines whether the motor current Imt exceeds the preset metal blade determination value TH2 during execution of the first start control so as to determine the type of the rotary blade 4. This allows the grass cutter 1 to determine the type of the rotary blade 4 by a simple method of comparing the motor current Imt and the metal blade determination value TH2.

The grass cutter 1 includes the mode-changing switch 15 that is manipulated by the operator to set the rotation speed of the rotary blade 4. In the first start control, manipulation performed on the mode-changing switch 15 is disabled. This allows the grass cutter 1 to easily drive the motor 20 so that the type of the rotary blade 4 can be determined.

The blade determination variation is larger than the normal time variation. This allows the grass cutter 1 to increase electric current flowing to the motor 20 and easily determine the type of the rotary blade 4.

The grass cutter 1 includes the trigger switch 12 that is manipulated by the operator to switch between driving and stopping the motor 20. In the first start control, manipulation performed on switches other than the trigger switch 12 is disabled. This allows the grass cutter 1 to easily drive the motor 20 so that the type of the rotary blade 4 can be determined.

In the above-described embodiment, the grass cutter 1 corresponds to an electric working machine, the rotary blade 4 corresponds to a tip tool, the drive portion 3 corresponds to an attachment portion, and the control portion 9 corresponds to a controller.

The processes in S330, S340, S420 and S430 correspond to the first start control, and the processes in S40, S330, S340, S440 and S450 correspond to the second start control.

The motor current Imt corresponds to a determination parameter, and the metal blade determination value TH2 corresponds to a tip tool determination value.

The mode-changing switch 15 corresponds to a rotation speed manipulator, the blade determination variation corresponds to an increase in first rotation speed, the normal time variation corresponds to an increase in second rotation speed, and the trigger switch 12 corresponds to a driving operating portion.

Second Embodiment

In the second embodiment, differences from the first embodiment will be described. The same reference numerals are given to the common components.

The grass cutter 1 of the second embodiment is different from that of the first embodiment in that there are changes in the blade determination process.

The blade determination process of the second embodiment is different from that of the first embodiment in that the processes of S602 and S604 are added.

Figure 12:
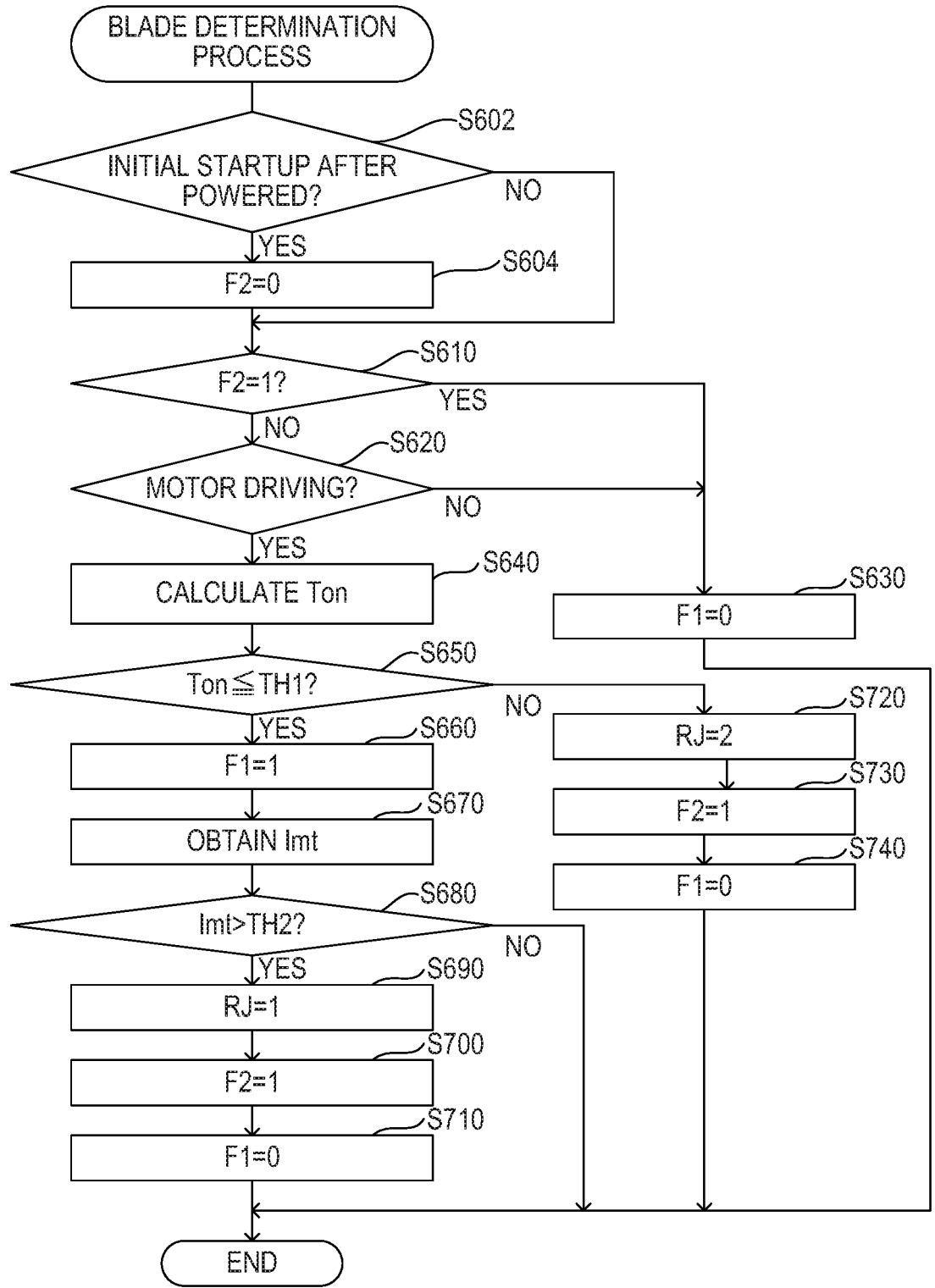
FIG. 12 is a flowchart showing a blade determination process according to a second embodiment.

When the blade determination process of the second embodiment is executed, the control circuit 36, as shown in FIG. 12, first determines in S602 whether it is an initial startup since electric power is supplied to the grass cutter 1. When it is an initial startup, the control circuit 36 clears the blade determination complete flag F2 in S604, and moves to S610. When it is not an initial startup, the control circuit 36 moves to S610.

The grass cutter 1 configured as above includes the drive portion 3, the motor 20, and the control portion 9. Multiple types of rotary blades 4 are alternatively attached to the drive portion 3. The motor 20 drives the rotary blade 4 attached to the drive portion 3.

The control portion 9 has first start control and second start control. The control portion 9 executes the first start control at initial startup following power supply so as to determine the type of the rotary blade 4, and executes the second start control at startup after execution of the first start control following the power supply.

As above, the grass cutter 1 determines the type of the rotary blade 4 by executing the first start control in which the motor 20 is started and controlled with the command rotation speed and the unit time variation for blade determination. Therefore, determination accuracy of the type of the attached rotary blade 4 can be improved. The grass cutter 1 executes the second start control at startup after execution of the first start control following the power supply. Therefore, the grass cutter 1 can suppress loss of workability by the grass cutter 1 due to having a function to determine the type of the rotary blade 4. Since the grass cutter 1 does not execute the first start control after execution of the first start control at the initial startup following the power supply, deterioration in usability, such as sluggish startup, can be suppressed.

The embodiments of the present disclosure have been described in the above. The present disclosure is not limited to the above-described embodiments, and can be practiced in various forms.

For example, in the above-described embodiments, the electric working machine is the grass cutter 1. The electric working machine may be a multi tool or a lawn mower.

In the above-described embodiments, the duty ratio of the PWM signal is calculated by feedback control. Alternatively, the duty ratio may be calculated using a map showing a correspondence relationship between the target rotation speed and the duty ratio, or using an arithmetic expression, etc.

In the above-described embodiments, the determination parameter is the motor current Imt. Alternatively, a parameter relating to operation of the motor and a product such as a slope of electric current (that is, increase rate in electric current), the rotation speed, a slope of the rotation speed (that is, increase rate in rotation speed), the duty ratio of the PWM signal, vibration (that is, acceleration) and the like may be used as the determination parameter.

Functions of one component in the aforementioned embodiments may be achieved by two or more components, and a function of one component may be achieved by two or more components. Functions of two or more components may be achieved by one component, and a function achieved by two or more components may be achieved by one component. A part of the aforementioned embodiments may be omitted. At least a part of the configuration of the aforementioned embodiment may be added to or may replace the configuration of the other embodiment.

In addition to the above-described grass cutter 1, the present disclosure may be practiced in various modes such as a system comprising the grass cutter 1 as a component, a program enabling a computer to function as the above-described grass cutter 1, a non-transitory tangible storage medium, such as a semiconductor memory storing the above-described program, and a method for controlling an electric working machine.

What is claimed is:

1. An electric working machine comprising:
   an attachment portion to which multiple types of tip tools are alternatively attached;
   a motor that drives a tip tool attached to the attachment portion; and
   a control circuit configured to execute a first start control in which the motor is started and controlled with a first parameter, and a second start control in which the motor is started and controlled with a second parameter, the second parameter being different from the first parameter, the control circuit being configured to execute the first start control to determine a type of the tip tool in response to not having tool type information on the tip tool, and the control circuit being configured to execute the second start control in response to having the tool type information, wherein
   an increase per unit time in rotation speed of the motor is set as an increase in rotation speed,
   the first parameter includes an increase in first rotation speed, the increase in the first rotation speed being an increase in the rotation speed at the time of rotating the motor during execution of the first start control by the control circuit,
   the second parameter includes an increase in second rotation speed, the increase in the second rotation speed being an increase in the rotation speed at the time of rotating the motor during execution of the second start control by the control circuit, and
   the increase in the first rotation speed is larger than the increase in the second rotation speed.

2. The electric working machine according to claim 1, wherein the control circuit is configured to detect a determination parameter set in advance to determine the type of the tip tool, and determine the type of the tip tool by determining whether the determination parameter exceeds a preset tip tool determination value during execution of the first start control.

3. The electric working machine according to claim 1, further comprising:
   a rotation speed manipulator configured to be manipulated by an operator to set rotation speed of the motor,
   wherein, in the first start control, manipulation performed on the rotation speed manipulator is disabled.

4. The electric working machine according to claim 1, further comprising:
a driving operating portion configured to be manipulated by an operator to switch between driving and stopping the motor,
wherein, in the first start control, manipulation on other portions than the driving operating portion is disabled.

5. The electric working machine according to claim 1, wherein the electric working machine is a grass cutter.

6. The electric working machine according to claim 1,
wherein a target value of rotation speed of the motor is set as target rotation speed,
wherein the target rotation speed at the time of rotating the motor during execution of the first start control by the control circuit is set as first target rotation speed,
wherein the target rotation speed at the time of rotating the motor during execution of the second start control by the control circuit is set as second target rotation speed, and
wherein a maximum value of the first target rotation speed is smaller than a maximum value of the second target rotation speed.

7. The electric working machine according to claim 2,
wherein the determination parameter is one of electric current flowing to the motor, an increase rate in the electric current, rotation speed of the motor, an increase rate in the rotation speed, a duty ratio of a PWM signal for drive control of the motor, or vibration.

8. An electric working machine comprising:
an attachment portion to which multiple types of tip tools are alternatively attached;
a motor that drives a tip tool attached to the attachment portion; and
a control circuit configured to execute A first start control in which the motor is started and controlled with a first parameter, and A second start control in which the motor is started and controlled with a second parameter, the second parameter being different from the first parameter, the control circuit being configured to execute the first start control at initial startup following power supply to determine a type of the tip tool, and the control circuit being configured to execute the second start control at startup after execution of the first start control following the power supply, wherein
an increase per unit time in rotation speed of the motor is set as an increase in rotation speed,
the first parameter includes an increase in first rotation speed, the increase in the first rotation speed being an increase in the rotation speed at the time of rotating the motor during execution of the first start control by the control circuit,
the second parameter includes an increase in second rotation speed, the increase in the second rotation speed being an increase in the rotation speed at the time of rotating the motor during execution of the second start control by the control circuit, and
the increase in the first rotation speed is larger than the increase in the second rotation speed.

9. The electric working machine according to claim 8,
wherein the control circuit is configured to detect a determination parameter set in advance to determine the type of the tip tool, and determine the type of the tip tool by determining whether the determination parameter exceeds a preset tip tool determination value during execution of the first start control.

10. The electric working machine according to claim 8, further comprising:
a rotation speed manipulator configured to be manipulated by an operator to set rotation speed of the motor,
wherein, in the first start control, manipulation performed on the rotation speed manipulator is disabled.

11. The electric working machine according to claim 8, further comprising:
a driving operating portion configured to be manipulated by an operator to switch between driving and stopping the motor,
wherein, in the first start control, manipulation on other portions than the driving operating portion is disabled.

12. The electric working machine according to claim 8, wherein the electric working machine is a grass cutter.

13. The electric working machine according to claim 8,
wherein a target value of rotation speed of the motor is set as target rotation speed,
wherein the target rotation speed at the time of rotating the motor during execution of the first start control by the control circuit is set as first target rotation speed,
wherein the target rotation speed at the time of rotating the motor during execution of the second start control by the control circuit is set as second target rotation speed, and
wherein a maximum value of the first target rotation speed is smaller than a maximum value of the second target rotation speed.

14. The electric working machine according to claim 9,
wherein the determination parameter is one of electric current flowing to the motor, an increase rate in the electric current, rotation speed of the motor, an increase rate in the rotation speed, a duty ratio of a PWM signal for drive control of the motor, or vibration.

* * * * *